United States Patent [19]
Noguchi et al.

[11] Patent Number: 5,504,304
[45] Date of Patent: Apr. 2, 1996

[54] HOT RUNNER PROBE AND ITS EQUIPMENT

[75] Inventors: Kiyomitsu Noguchi, Nan-yo; Toshihide Kasuga, Kaminoyama; Hiraku Shindo, Yonezawa, all of Japan

[73] Assignee: Seiki Kabushiki Kaisha, Tokyo, Japan

[21] Appl. No.: 327,917

[22] Filed: Oct. 24, 1994

[30] Foreign Application Priority Data

Aug. 24, 1994 [JP] Japan .................................. 6-199508

[51] Int. Cl.⁶ ........................................................ F27B 14/00
[52] U.S. Cl. .......................... 219/426; 219/239; 219/421; 425/130
[58] Field of Search .................... 219/421–426, 219/230, 238–239; 425/130, 190, 540, 549

[56] References Cited

U.S. PATENT DOCUMENTS

| | | | |
|---|---|---|---|
| 4,576,567 | 3/1986 | Gellert | 425/549 |
| 4,940,870 | 7/1990 | Shibata et al. | 425/549 |
| 5,220,154 | 6/1993 | Gunther | 219/421 |
| 5,226,596 | 7/1993 | Okamura | 425/549 |
| 5,232,710 | 8/1993 | Miyazawa et al. | 425/130 |
| 5,235,737 | 8/1993 | Gellert | 219/426 |

*Primary Examiner*—Tu Hoang
*Attorney, Agent, or Firm*—Elliot M. Olstein; Raymond J. Lillie

[57] ABSTRACT

The present invention relates to a hot runner probe having a shell-shaped probe body having a molten resin flowing surface which is combined to form a single unit with a ceramic heater wherein the ceramic heater is covered by the heater pattern that consists of high electric-resistance metal and has made the temperature gradient at the tip part higher than that at the center part, and then is insulation-baked. The present invention also relates to high-accuracy injection molding using the hot runner probe under the proper and ideal temperature distribution, by applying the ceramic heater, which is provided with temperature gradients, to the increase and decrease of resistance values due to temperature changes by the one circuit control means.

7 Claims, 11 Drawing Sheets

HOT RUNNER PROBE AND ITS EQUIPMENT

BACKGROUND OF THE INVENTION

1. Field of the Invention

This invention relates to a hot runner probe and its equipment which can perform high-accuracy injection molding operations of synthetic resin.

2. Brief Description of the Prior Art

In general, a heater for synthetic resin injection molding consists of nichrome wires, and since this exothermic body made of nichrome wires shows only minor changes in the resistance value due to temperature changes, a step-shaped exothermic body is used to partially change temperatures, for instance, as shown in Laid-open Japanese Utility Model Application No. 56-26227.

Similarly, the heater shown in Publication Japanese Patent Application No. 4-82095 is also a cartridge-type electric heater in which nichrome wire is made into a coil-shaped resistance wire.

Now in this type of hot runner probe applied by the present applicant, a unit using a ceramic heater shown in Laid-open Japanese Patent Application No. 2-100284 is known, but the present invention relates to a composition which is composed of two kinds of ceramic heaters or a combination of one ceramic heater and another exothermic body.

In the above-mentioned heater using conventional nichrome wire, it is inconvenient to have proper temperature distribution over the entire probe, because the increase and decrease of resistance due to temperature changes are little. Also in the compositions of using two different kinds of ceramic heaters or a combination of the ceramic heater and another type of heater, it is necessary to control two different heaters respectively, and since this is impossible by operating a single control means, the composition became complicated and large in size, posing a problem of not being able to offer the invention at a reasonable price.

SUMMARY OF THE INVENTION

The present invention has been executed by paying attention to the above-mentioned points. Through the use of the ceramic heater having a temperature gradient, the present invention provides a hot runner probe and its equipment which can carry out proper temperature distribution over the entire probe, and which has a high grade of moldability and excellent durability.

Namely, this invention relates to the heat runner probe, which features that a shell-shaped probe body, having a molten resin flowing surface, is made into a single unit with the ceramic heater which has been covered by the heater pattern-that consists of high electric resistance metal, which has made the thermal gradient at the tip part higher than that at the central part—and has been insulation-baked. The heater pattern of the aforesaid ceramic heater has been made to obtain a temperature gradient by connecting high electric-resistant metals, which have large or small or different wire width and wire density. Said ceramic heater is constructed by arranging the central shaft of the shell-shaped probe body and on the peripheral surface of the shell-shaped probe body.

Furthermore, this invention relates to a hot runner probe equipment which comprises the nozzle attachment that connects to the tip nozzle of the injection molding machine; the manifold that is in communication with the nozzle attachment; numerous runner parts branching from this manifold that is in communication with this nozzle attachment; the gate formed at the tip of this runner part; and the cavity that is in communication with this gate; and said hot runner probe being a shell-shaped probe, which is equipped with a ceramic heater having a heater pattern of high electric-resistance metal, making the temperature gradient at the tip on the gate side along said runner part and said gate higher than the other side. The heater pattern of said ceramic heater has a feature that a temperature pattern can be obtained by the connection of high electric-resistance metals of smaller or larger or different in wire thickness and wire density, and said runner part is formed around the periphery of said shell-shaped probe, the ceramic heater is formed by arranging on the central shaft of said shell-shaped probe or forming on the central shaft of said shell-shaped probe. The ceramic heater is composed by arranging on the surface at the periphery of said shell-shaped probe.

By the aforementioned composition, high-accuracy synthetic resin injection molding operation can be carried out under proper and ideal temperature distribution by applying the increase and decrease of the resistance value due to temperature changes of the ceramic heater.

In the shell-shaped probe body, the heater pattern of high electric-resistant metals have made the temperature gradient at the tip part higher than at the center part, the temperature that applies to the gate portion is higher and more effectively works, and therefore, the temperature that works on the gate part is made higher than that at the central part, and the temperature that acts on the gate portion becomes higher and works more efficiently, thereby ensuring a necessary temperature at the gate opening.

Since the ceramic heater which is equipped with the heater pattern, is arranged on the center shaft or on the periphery surface of the probe body, the runner portion is formed at the periphery portion or on the central shaft of the probe body, and is sufficiently insulated, thereby ensuring crisp heating.

Consequently, it is possible to obtain high quality molding products under the effective execution of controlling the thermal-melting condition from the runner part to the gate part and the injection molding operation.

DETAILED DESCRIPTION OF THE PREFERRED EMBODIMENTS

Figure 1:
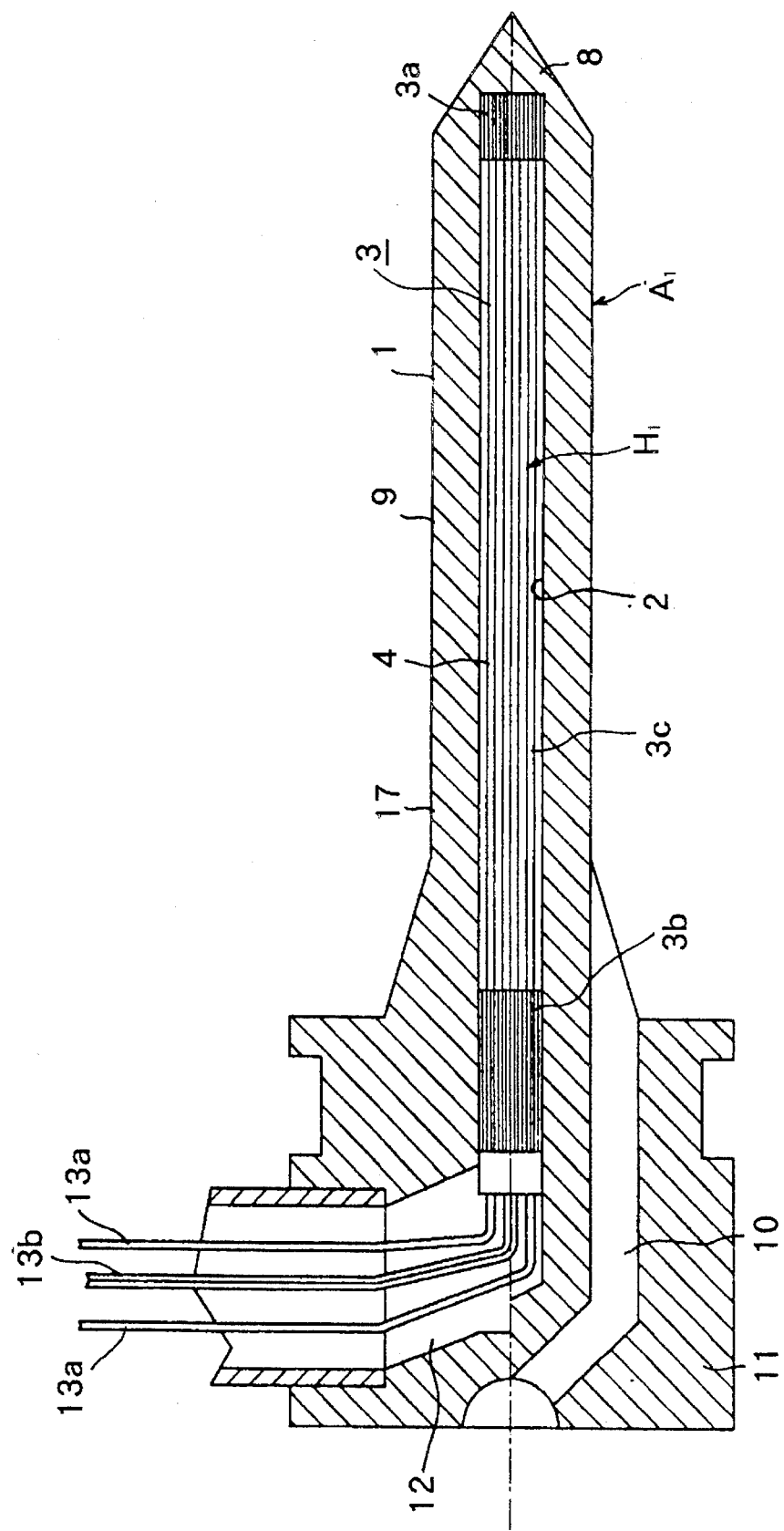
FIG. 1 is a profile that shows a preferred embodiment of a hot runner probe related to this invention.

Preferred embodiments of the present invention are explained by referring to the respective drawings as follows: FIG. 1 shows a hot runner probe $A_1$, which has been provided by inserting the ceramic heater in hollow 2, that has been cut through the center shaft of shell-shaped probe body 1.

Figure 2:
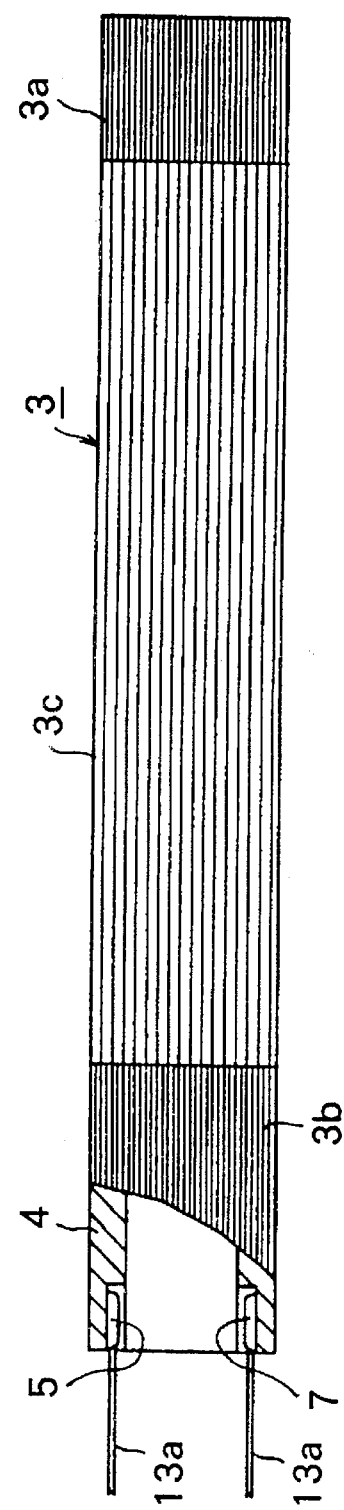
FIG. 2 is a cutaway side view of said ceramic heater.

In said ceramic heater 3, heater pattern $H_1$ is formed, as shown in FIGS. 1 and 2, so that the temperature gradient between tip 3a and base part 3b can be set higher than that at the other central part.

Figure 3:
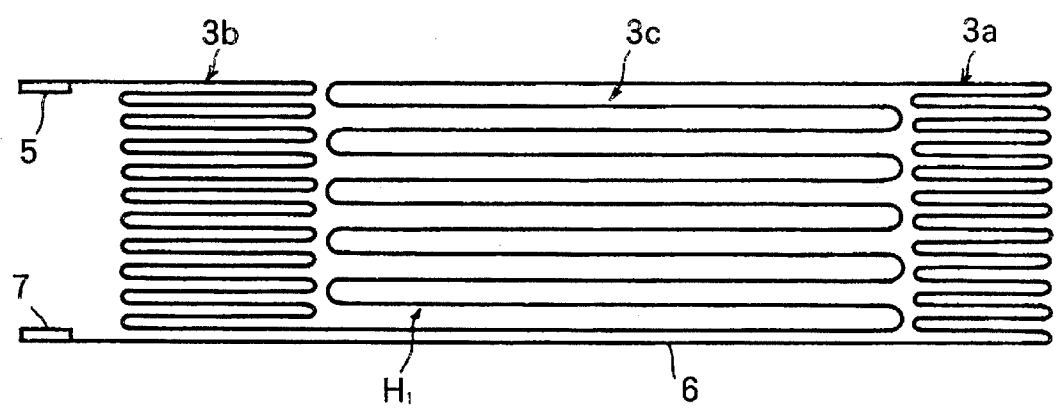
FIG. 3 is a plan view of said ceramic heater wherein heater pattern is developed in a plane, namely, an explanatory view wherein the temperature gradient is formed by the high or low density of wires, that is, the magnitude of wire density is used to form a temperature gradient.

For instance, a mixture of insulating ceramic powder such as silicon carbide (SiC), molybdenum cilicide ($MoSi_2$) or alumina ($Al_2O_3$) and silicon nitride (SiN), and electrically conductive ceramic powder such as titanium nitride (TiN) and titanium carbide (TiC) is sintered and kneaded into a paste, then this paste is printed in a snaking manner on the external surface of the preferred cylindrical insulating ceramic body 4, spreading from base part 3b to central part 3c and tip part 3a, as shown in FIG. 3. At base part 3b and tip part 3a, the printing state is made denser than at central part 3c, and by the magnitude of the so-called "wire density," a temperature gradient is given.

The printing state is made to proceed in a snaking way, as shown in the developmental view of FIG. 3, to connect base part 3b, central part 3c and tip part 3a by a single continuous exothermic resistance line, and base 3b is wired to one terminal 5. At tip 3a, conductor 6 that goes to base part 3b is also print-wired, and its end part is fixed securely to other terminal 7, thereby forming a pair of parallelly installed terminal structures.

Figure 4:
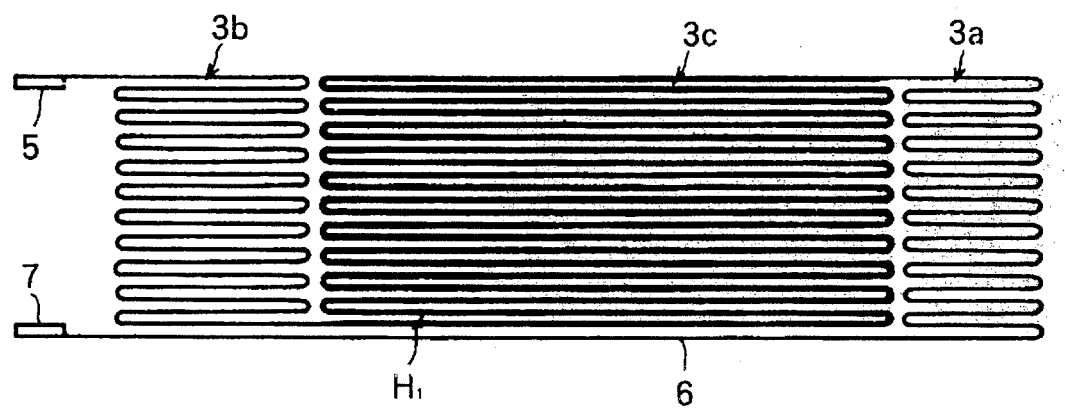
FIG. 4 is a plan view wherein the heater pattern shows another preferred embodiment, that can demonstrate practically the same heat effect as the above-mentioned ceramic heater is developed in a plane view, and is an explanatory view used in the case of forming a temperature gradient by the magnitude of the width of wires.

While a temperature gradient is formed by a single continuous exothermic resistance wire, FIG. 3 shows that this is carried out by the high or low density of the snaking condition, namely, the magnitude of wire density, but it is also possible, as shown in FIG. 4, to change the resistance values by the magnitude of wire gage, namely, by the magnitude of the wire width. Furthermore, even when plural exothermic resistance wires are used (which are not shown in the figure), there is no difficulty, if the parallel conditions or serial conditions are combined.

Also it can be easily executed to connect the parts of different high electrical resistance metals to make the resistance value at the tip part higher than at the other parts.

In addition, heater pattern $H_1$ can be formed in the same way as shown earlier by using any desirable metals such as tungsten, molybdenum, gold and platinum other than the high electric-resistance metals as mentioned before.

Then, shell-type probe body 1 comprises conical part 8 at the tip, cylindrical part 9, and also base part 11 where resin flowing part 10 is cut through. Lead wire 13b is led out, which is connected to terminals 5 and 7 of ceramic heater 3, which has been inserted into said hollow 2 from opening 12, that leads to said hollow 2. Lead wire 13b of the thermocouple for temperature measuring to be installed at the tip-most end in said hollow 2 is similarly led out.

Consequently, in the hot runner probe $A_1$ based on this preferred embodiment, the thermal action works from the outside circumference toward the outside.

Figure 5:
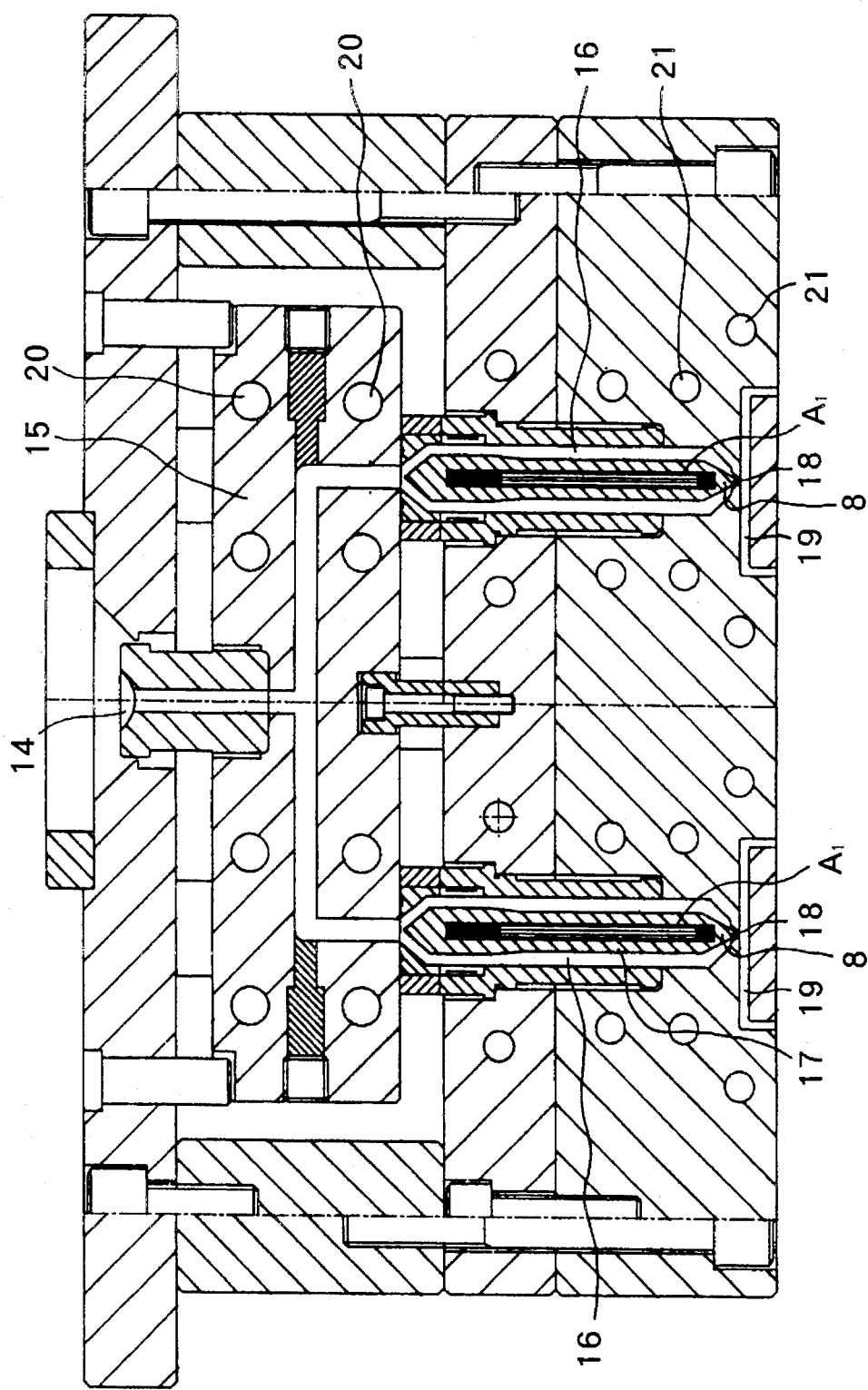
FIG. 5 is a profile of the entire equipment which has incorporated the hot runner probe shown in FIG. 1.

FIG. 5 shows the profile of the equipment in which said hot runner probe $A_1$ is provided.

In FIG. 5, 14 is the nozzle attachment engaged with the nozzle of an injection molding machine (which is not shown in the figure), and 15 is the manifold in communication with this nozzle attachment 14. Code 16 shows the various runner parts branching from this manifold 15, and said hot runner probe $A_1$ is provided, and the peripheral surface of this probe $A_1$ is used as the molten resin flowing surface 17. Code 18 is a narrow gate formed in front of runner part 16, and this narrow gate 18 is in communication with cavity 19. At gate 18, there is a conical part which is formed at the tip of probe $A_1$.

Code 20 shows a heater and code 21 is hole for cooling water, respectively.

Figure 6:
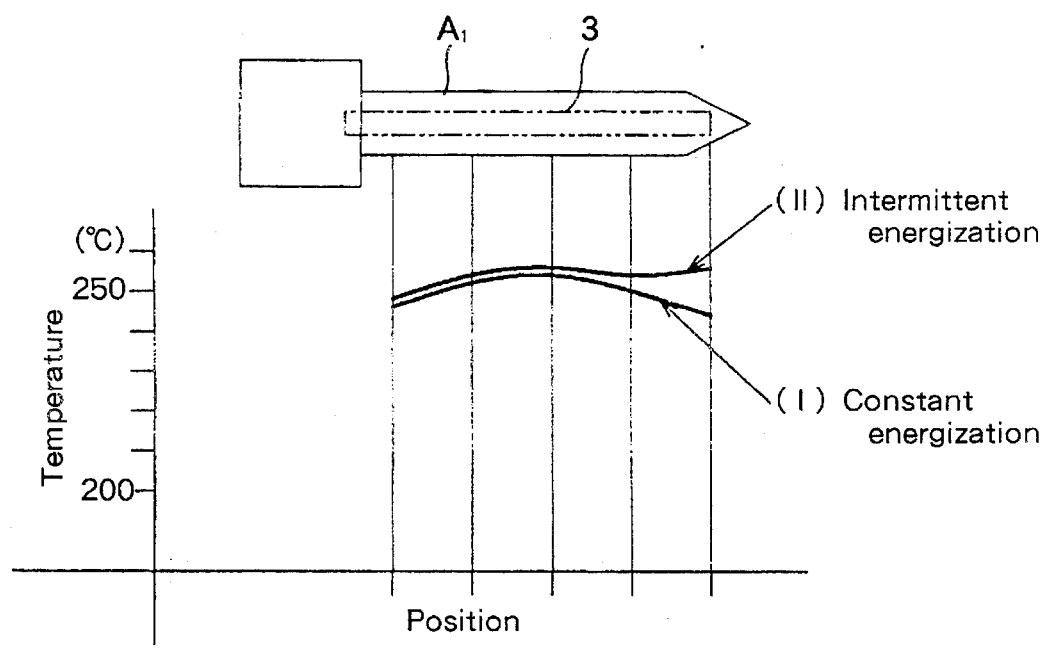
FIG. 6 is a graph showing the temperature changes during power-energizing time of the ceramic heater related to the present invention, in a positional relation with the hot runner probe.

FIG. 6 shows the temperature distribution (exothermic distribution) that acts on various parts of hot runner probe body $A_1$ when ceramic heater 3 shown in the above-mentioned preferred embodiment is energized. There are two cases, namely, the case of constant energization (I) and intermittent energization made during each molding operation (II). In both cases, the temperature distribution is proper.

Figure 7:
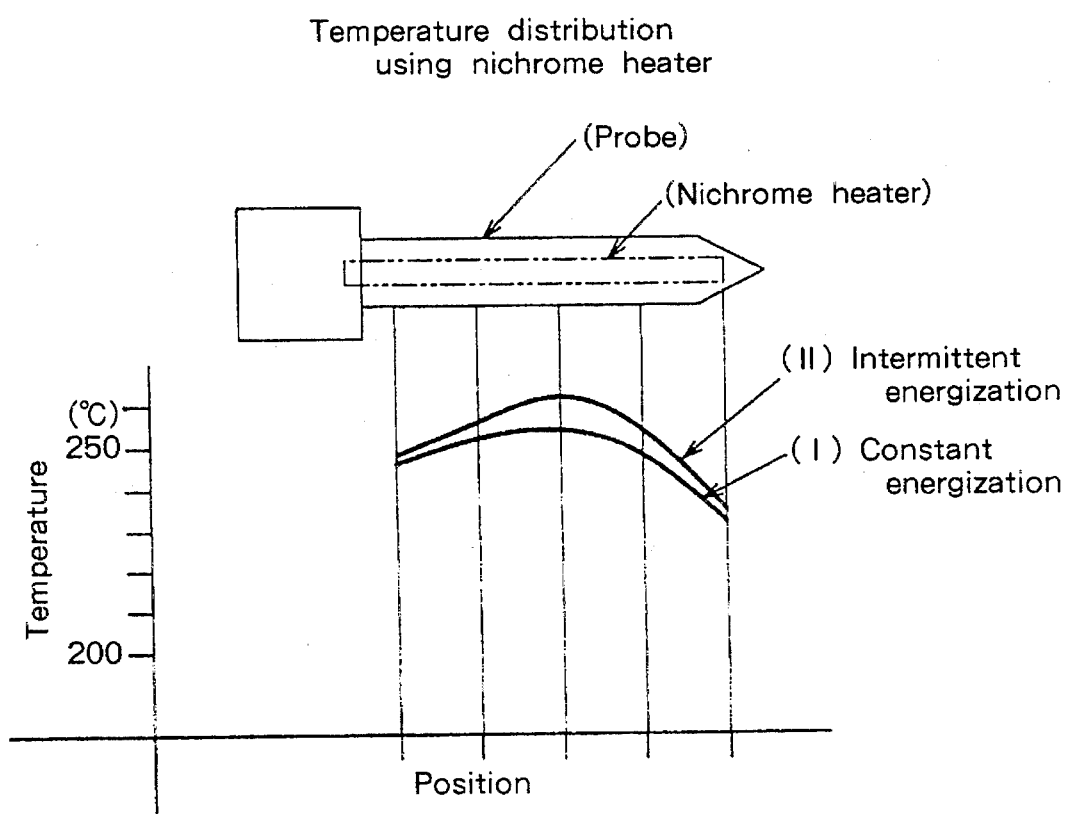
FIG. 7 is a graph showing temperature changes during the energizing time of the conventional nichrome wire in a positional relation with the hot runner probe.

FIG. 7 shows temperature distribution (exothermic distributions) that acts on various parts of the hot runner probe body, when conventional nichrome heater N is used. This result is compared with FIG. 6. In the case of both constant energization (I) and intermittent energization (II), temperature distributions are nearly the same, and in both cases, temperatures at both ends have dropped below compared to those at the central part, therefore it shows that the on-off control of gate 18 at the time of solidification or melting of the molding resin has not been carried out properly.

Based on the above-mentioned composition, the action of the present invention is explained.

Molten resin, which is molded by an injection molding machine (which is not shown in the figure), passes through nozzle attachment 14, manifold 15 and runner part 16 and is injected from gate 18 into desired cavities 19 by desired quantity.

During each injection molding operation, the resin stored at runner part 16 is heated by ceramic heater 3 of hot runner probe $A_1$, and maintains the molten state. At the same time, the resin at gate 18 maintains physical properties of solidification, semi-solidification and melting. Then depending upon the kinds of resin and the shapes of molded products, the resin is given desirable heat control such as continuous heating by constant energization or intermittent heating by intermittent energization, and a single control means and highly accurate efficient molding can be carried out.

Figure 8:
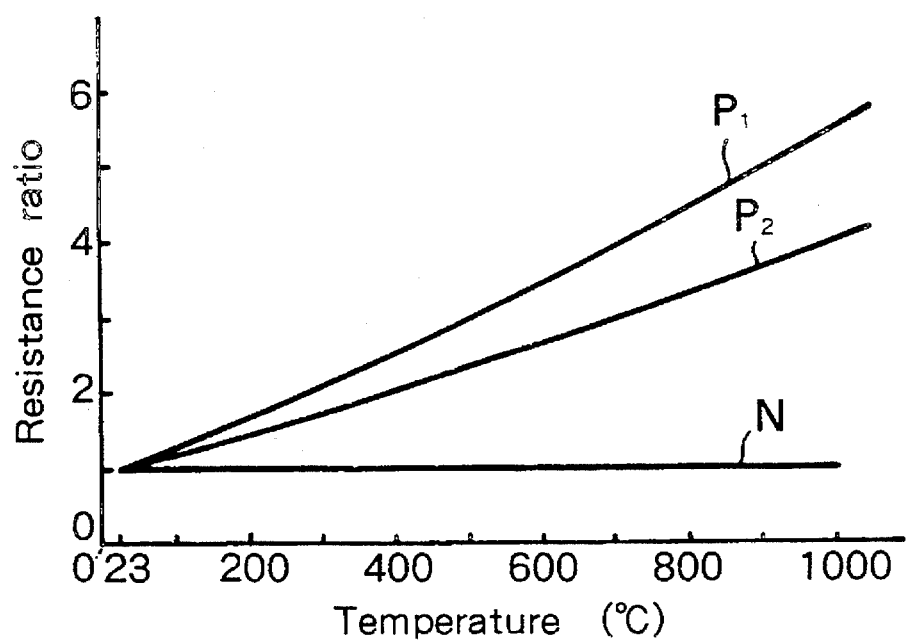
FIG. 8 is a graph showing the relation between the temperature and the resistance ratio of the nichrome wire and the ceramic heater.

Then naturally, not only in the case of the constant energization to ceramic heater 3, but also in the case of the intermittent energization the high electrical resistance metal gives a remarkable increase or decrease of the resistance values due to temperature changes, compared with the conventional nichrome wire. As a result, the so called "crisp" opening and closing of gate 18 are carried out to benefit the improvement of the moldability of resin. In FIG. 8, a comparison of resistance temperature coefficients between the nichrome wire and ceramic heater 3 is shown. It is recognized that the resistance ratios between temperature 23° C. and about 1,000° C. of two kinds of paste $P_1$ and $P_2$ for the ceramic heater show rising of resistance values, while the nichrome-wire heater N hardly changes, according to the experiment results.

Consequently, ceramic heater 3 shows fast temperature-rising speed of ceramic heater 3 is faster and quickly reaches the normal state which is different from the conventional nichrome wire type heater; hence ceramic heater tends to maintain the temperature constant, therefore its actions to the molten resin at runner 16 and to resin at gate 18, wherein the resin is in the states of melting, semi-consolidation or consolidation are carried out most properly. In particular, the temperature distribution of the ceramic heater 3 has a temperature gradient, wherein the temperature at tip part 3a is maintained higher than that of center part 3c. In addition, temperature control on ceramic heater $H_1$ is carried out by a control means of a single circuit, thereby making it possible to carry out a very crisp heating operation by a simple single temperature control.

Figure 9:
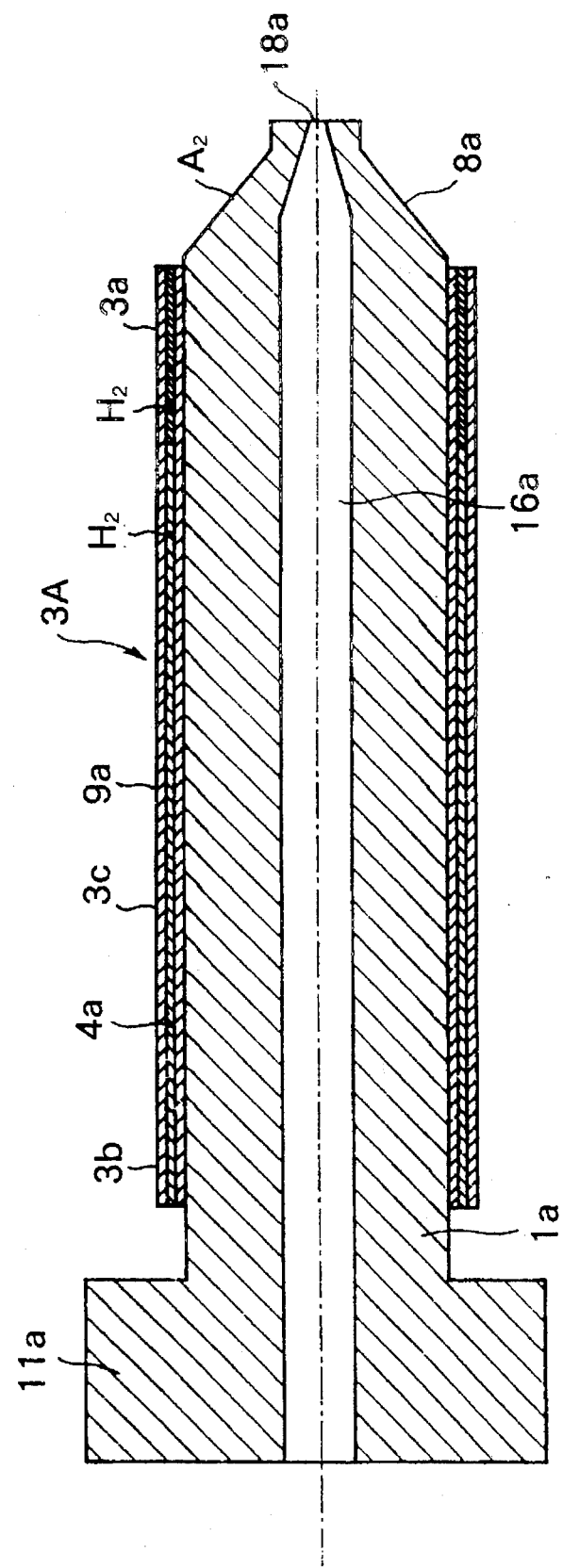
FIG. 9 is a profile showing another preferred embodiment of the hot runner probe related to the present invention.

The above is related to the preferred embodiment wherein runner part 16 is formed at the outer periphery of hot runner probe $A_1$, but in hot runner probe wherein $A_2$ runner part 16 is cut through into the central shaft, the same measure can be proceeded as shown in FIG. 9.

Namely, in FIG. 9, hot runner probe $A_2$ is formed by making the tip into conical part 8a, and furthermore, by using cylindrical part 9a and base part 11a to form the entire parts into shell-shaped probe body 1a, and then by roughly slipping over ring-shaped ceramic heater 3A which has the same composition as shown in FIG. 2, over said outer circumference.

Then, this ceramic heater 3A, in the same way as with said preferred embodiment, is sintered and kneaded into paste of the mixture of insulation ceramic powder such as silicon carbide, molybdenum silicide or alumina and conductive ceramic powder such as titanium nitride and titanium carbide and prints the paste in a single snaking line on base part 3b, center part 3c and tip part 3a around the outer circumference of insulation ceramic base body 4a. Then heater pattern $H_2$ is formed by applying temperature gradients by the magnitude of wire density such as loosely in wire arrangement at base part 3b and center part 3c, and dense at tip part 3a.

Therefore, since this hot runner probe $A_2$ is provided with ceramic heater 3A along the outer surface of probe proper 1a, it performs a work to give thermal action towards runner part 16a on the center shaft.

Since tip part 3a is made to have higher temperature gradient than other parts 3b and 3c, regionally very effective thermal action works to gate 18a and crisp heating operation can be performed, which excels in heat-raising response peculiar to ceramic heater 3A.

Figure 10:
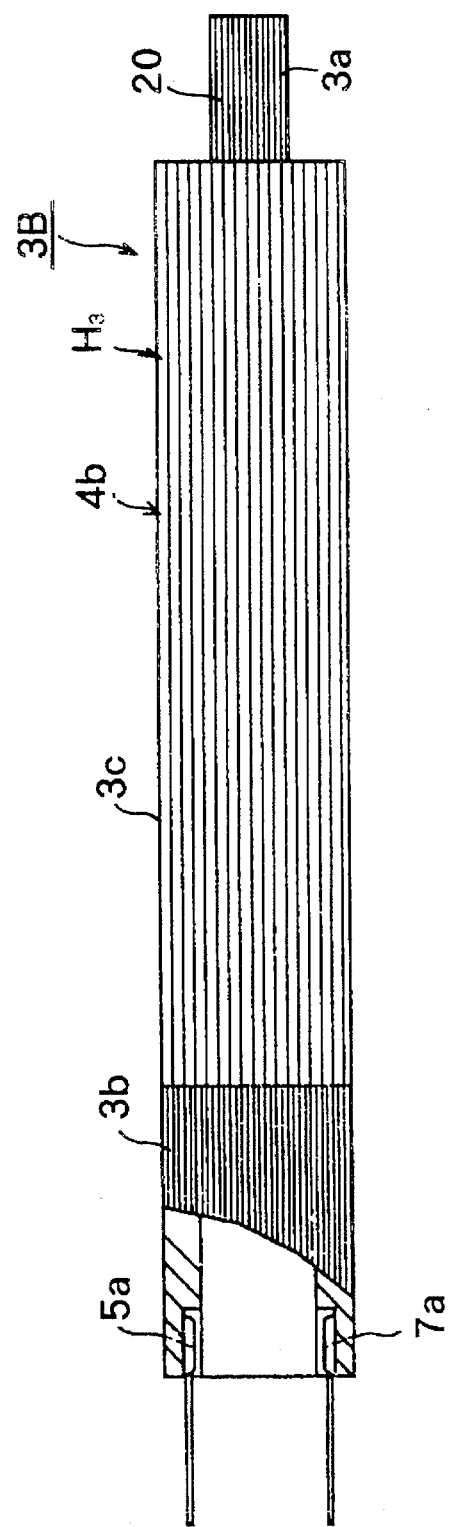
FIG. 10 is a cutaway side view showing another composition of the ceramic heater.
Figure 11:
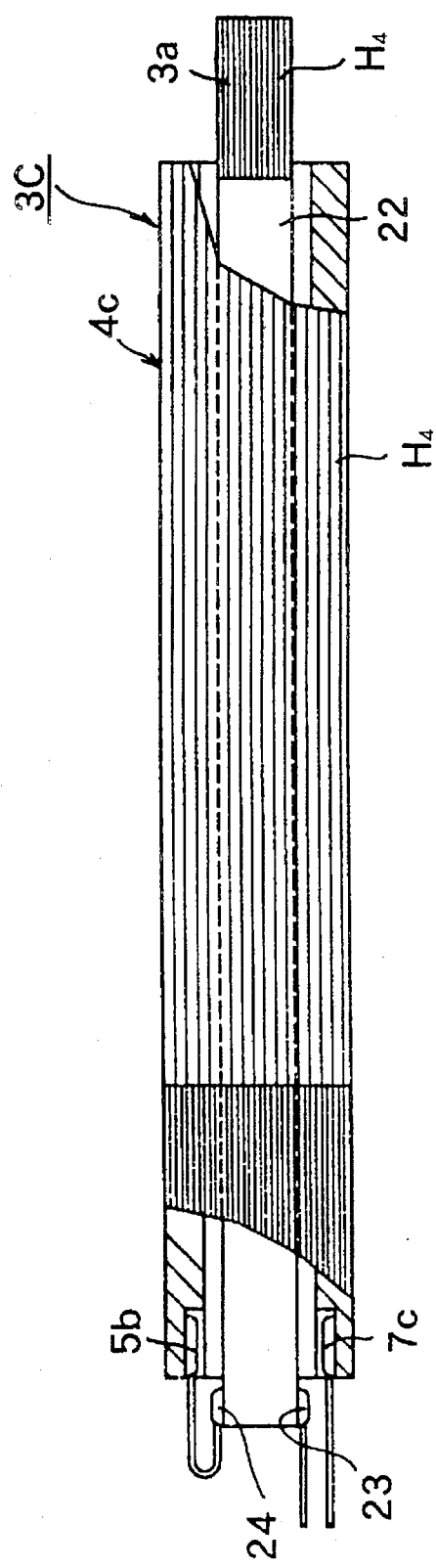
FIG. 11 is a cutaway side view showing another composition of the ceramic heater.
Figure 12:
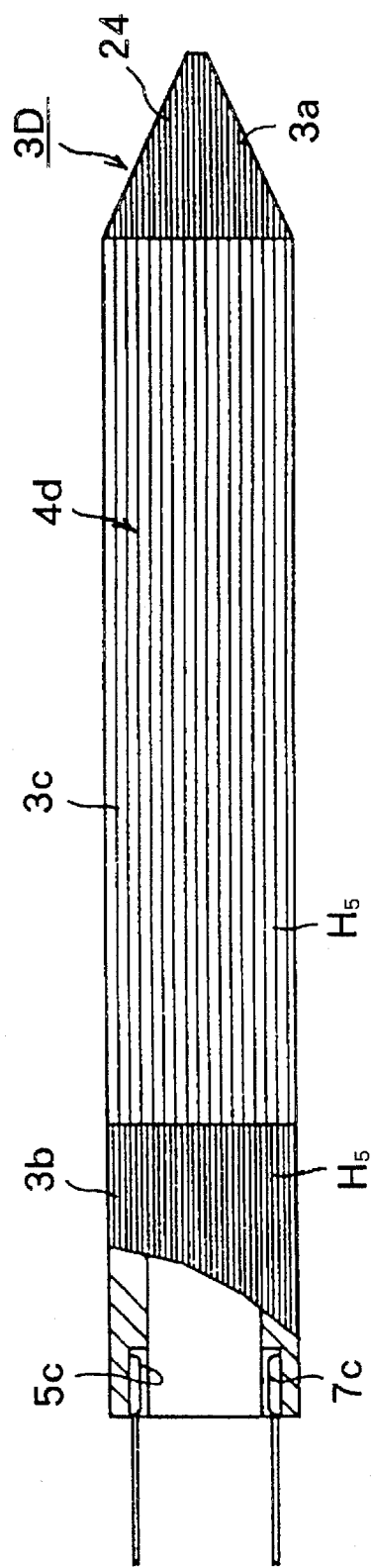
FIG. 12 is a cutaway side view showing a still further composition of the ceramic heater.

Next, FIGS. 10, 11 and 12 respectively show three examples 3B, 3C and 3D of ceramic heaters, which are penetrated into hollow 2 of shell-shaped probe body 1 shown in FIG. 1.

Ceramic heater 3B shown in FIG. 10 is formed on cylindrical insulation ceramic base body 4b, which has the same diameter as base part 3b and center part 3c, and tip part 3a is formed, maintaining a step to insulation ceramic body 20, which is smaller in diameter. This ceramic heater 3B carries out print-wiring using heater pattern $H_3$, wherein temperature gradients become higher at tip part 3a and base part 3b than center part 3c. Here 5a and 7a are a pair of terminals of said heater pattern $H_3$.

In ceramic heater 3C shown in FIG. 11—instead of tip part 3b and center part 3c being formed on the outer circumference of cylindrical insulating ceramics base body 4c of the same diameters—tip part 3a is formed at the outer circumference of the tip of small-diameter insulating ceramics body 22.

Both circuits, which are respectively print-wired, and are formed into one circuit, using deformed heater pattern $H_4$, which has been separated and divided by connecting in series with respective terminals 5b, 7c, 23 and 24 provided at the bases of both parts 4c and 22.

Furthermore, explanation is given below to ceramic heater 3D shown in FIG. 12.

In this preferred embodiment, ceramic heater 3D is formed on cylindrical ceramic base body 4d in which base part 3b and central part 3c are formed on insulating ceramic base body 4d with tip part 3b and central part 3c having the same diameter, and with heat pattern $H_5$, in which tip part 3a is formed on a conical ceramic part 24. Insulation processing work is carried out, and heat ingredients at base part 3b and tip part 3a are formed higher than that at central part 3c.

Then, at the base of insulating ceramic base body 4d, terminals 5c and 7c that can compose a circuit are provided.

All ceramic heaters 3B, 3C and 3D shown in FIGS. 10 to 12 can be obtained by practically the same work forming process means as ceramic heater shown in FIGS. 1 and 2. in order to maintain a single circuit composition, they are print-wired and run in a snaking manner as shown in FIGS. 3 and 4. They are made to form temperature gradients by the magnitude of snaking density or that of wire width. In addition, heater patterns $H_1$, $H_2$, $H_3$, $H_4$ and $H_5$ that compose ceramic heaters 3, 3A, 3B, 3C and 3D are all provided with a single continuous exothermic resistance wire. Its snaking condition is practically the same as the patterns shown in FIGS. 3 or 4. However, even plural exothermic resistance wires can be composed of by combining the parallel or plural conditions.

According to this invention, a heater pattern by high electric resistance metal is insulation-baked in probe body using a single resistant line; hence heating operation at the time of injection molding can be efficiently executed and the tip part which is provided near the gate is formed to be set at a high temperature gradient than at the central part, thereby permitting that the temperature distribution of the entire probe can be properly set.

Furthermore, through the intermittent heating operation of the probe body, changes in temperatures have become possible by an increase or decrease in resistant values, and the thermal action to the gate part is supplied crisply, thereby giving an advantage of correctly performing on-off gate control. Furthermore, although the heater itself is of a single circuit type, its performance similar to two-circuits operation can be demonstrated. Thus the present invention has an effect of now giving plural circuit composition, which was required in the past at a reasonable price.

What is claimed is:

1. A hot runner probe, comprising:
   a body portion, said body portion having an outer peripheral surface portion;
   a hollow portion contained within said body portion; and
   a heater adjacent said body portion, said heater including a tip portion, a center portion, and a base portion, and said heater including a wire traversing said tip portion, said center portion, and said base portion, whereby said heater is capable of providing a temperature gradient such that the temperature of said tip portion is greater than the temperature of said center portion.

2. The probe of claim 1 wherein said heater is contained within said hollow portion, and wherein the volume of wire per unit volume contained in said tip portion of said heater is greater than that contained in said center portion of said heater.

3. The probe of claim 1 wherein said heater is disposed adjacent said outer peripheral surface portion, and wherein the volume of said wire per unit volume contained in said tip portion is greater than that contained in said center portion.

4. An apparatus, comprising:
- a nozzle attachment capable of connecting with a tip nozzle of an injection molding machine;
- a manifold in communication with said nozzle attachment;
- a plurality of runner passages in communication with said manifold;
- a plurality of hot runner probes, wherein each of said plurality of hot runner probes is surrounded by a runner passage, and wherein each of said hot runner probes comprises a body portion, said body portion having an outer peripheral surface portion; a hollow portion contained within said body portion; and a heater contained within said hollow portion, said heater including a tip portion, a center portion, and a base portion, and said heater including a wire traversing said tip portion, said center portion, and said base portion, whereby said heater is capable of providing a temperature gradient such that the temperature of said tip portion is greater than the temperature of said center portion;
- a plurality of gate portions, wherein each of said plurality of gate portions is in communication with a runner passage and located adjacent a hot runner probe; and
- a plurality of cavities, wherein each of said plurality of cavities is in communication with a gate portion.

5. The apparatus of claim 4 wherein the volume of wire per unit volume contained in said tip portion of said heater is greater than that contained in said center portion of said heater.

6. An apparatus, comprising:
- a nozzle attachment capable of connecting with a tip nozzle of an injection molding machine;
- a manifold in communication with said nozzle attachment;
- a plurality of runner passages in communication with said manifold;
- a plurality of hot runner probes, each of said hot runner probes surrounding a runner passage, wherein each of said hot runner probes comprises a body portion, said body portion surrounding said runner passage and having an outer peripheral surface portion and a heater disposed adjacent said outer peripheral surface portion, said heater including a tip portion, a center portion, and a base portion, and said heater including a wire traversing said tip portion, said center portion, and said base portion, whereby said heater is capable of providing a temperature gradient such that the temperature of said tip portion is greater than the temperature of said center portion;
- a plurality of gate portions, wherein each of said plurality of gate portions is in communication with a runner passage and located adjacent a hot runner probe; and
- a plurality of cavities, wherein each of said plurality of cavities is in communication with said gate portion.

7. The apparatus of claim 6 wherein the volume of wire per unit volume contained in said tip portion is greater than that contained in said center portion.

* * * * *